United States Patent
Meyers

[11] Patent Number: 5,603,397
[45] Date of Patent: Feb. 18, 1997

[54] CENTRIFUGAL CLUTCH

[76] Inventor: Frederick C. Meyers, 7 W. Ayres St., Hinsdale, Ill. 60521

[21] Appl. No.: 432,602
[22] Filed: May 1, 1995
[51] Int. Cl.$^6$ ............................. F16D 13/10; F16D 43/18
[52] U.S. Cl. ................................. 192/105 BA; 192/113.4
[58] Field of Search ...................... 192/105 BA, 113.4, 192/31, 76

[56] References Cited

U.S. PATENT DOCUMENTS

| | | | |
|---|---|---|---|
| 1,196,363 | 8/1916 | Hunter et al. | 192/105 BA |
| 1,686,226 | 10/1928 | Conkling | 192/105 BA |
| 2,068,579 | 1/1937 | Tatter | 192/113.4 X |
| 2,375,909 | 5/1945 | Fawick | 192/105 BA |
| 2,455,086 | 11/1948 | Papas | 192/105 BA |
| 3,680,674 | 8/1972 | Horstman | 192/105 BA |

OTHER PUBLICATIONS

National Kart News, vol. 9, No. 2, Feb., 1995.
Kart Marketing International, Jan., 1995, pp. 17, 18, and 19 and the backcover.

Primary Examiner—Rodney H. Bonck
Attorney, Agent, or Firm—Pravel, Hewitt, Kimball & Krieger

[57] ABSTRACT

A centrifugal clutch apparatus for use with small motorized carts (or karts) that are powered with an internal combustion engine having a horizontal drive shaft includes a clutch hub having a central sleeve with a bore for mounting the sleeve on the drive shaft of an internal combustion engine. A backing plate extends radially and circumferentially from the sleeve. Wear pads are mounted on the backing plate at the periphery thereof on radial struts of the backing plate. The backing plate of the wear pads are positioned to travel radially when subjected to sufficient centrifugal force. Springs normally retain the backing plate of the wear pads in an inner starting, non-engaging position. Springs extend between a circular "floating" ring that is spaced about the clutch hub sleeve. The floating ring provides openings for attaching springs thereto. Hangers on the backing plate to the wear pads provide an attachment for an opposing end of each of the springs. As many as three or more springs can for example be positioned between a particular pad and the floating ring. The ring provides a floating construction that discourages heat transfer between the clutch housing and critical parts of the clutch, namely the springs which can and anneal at high temperatures of about 250° for example.

22 Claims, 2 Drawing Sheets

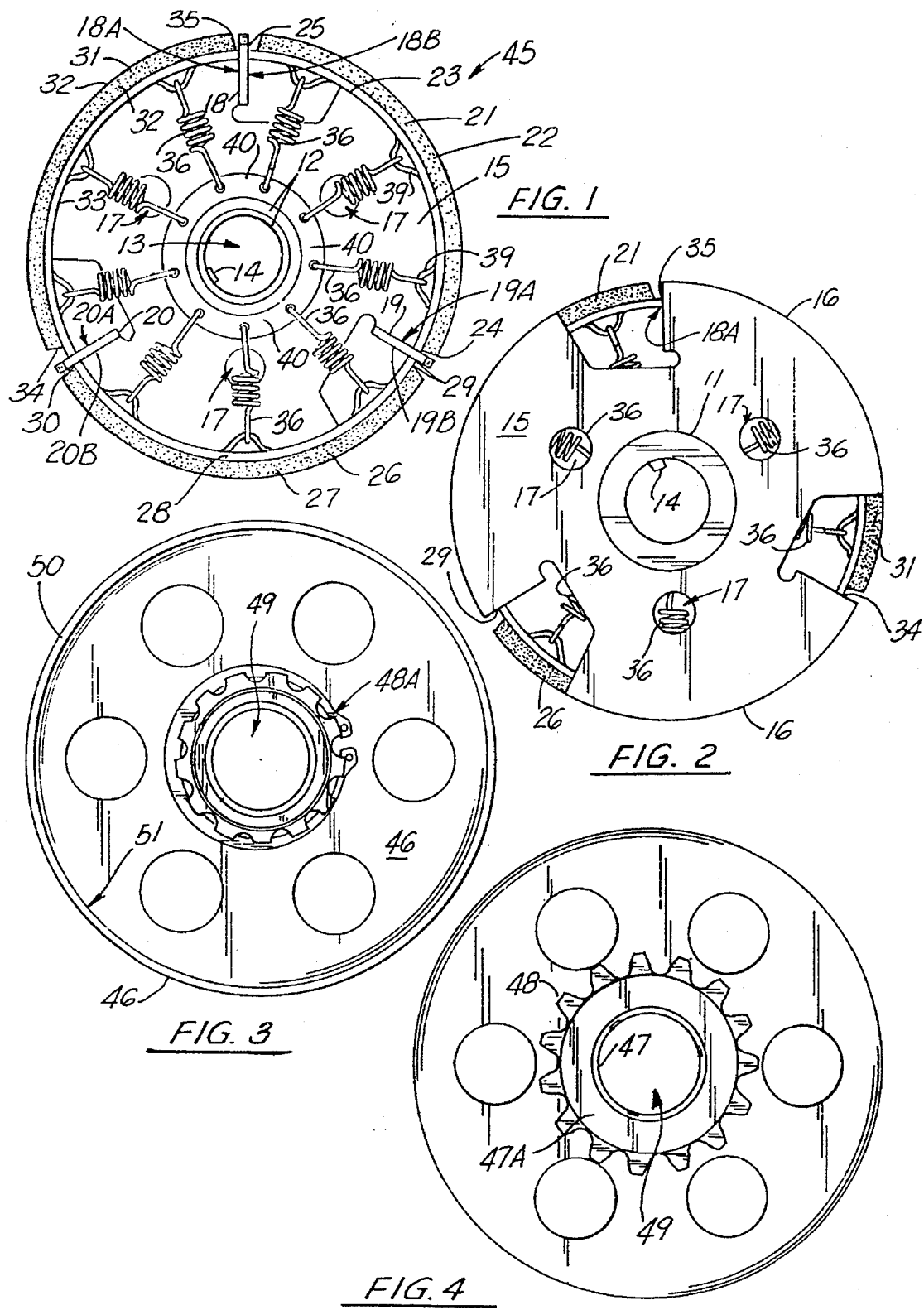

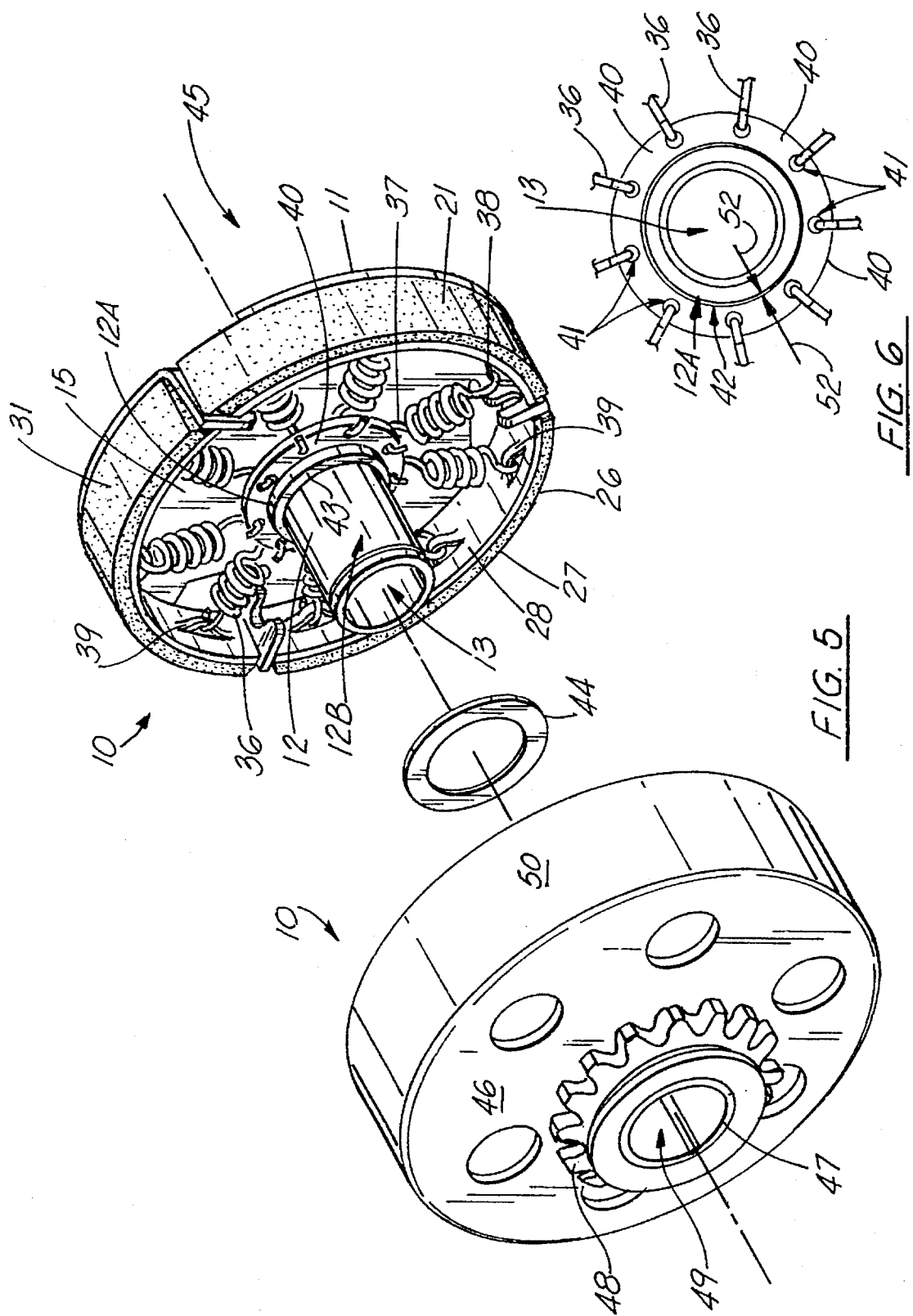

CENTRIFUGAL CLUTCH

BACKGROUND OF THE INVENTION:

1. Field of the Invention

The present invention relates to centrifugal clutching devices that are driven by a horizonal engine shaft that carries a clutch housing having a sprocket for driving a chain that engages the rear sprocket mounted to a wheel or axle of a powered cart. Even more particularly, the present invention relates to an improved centrifugal clutch apparatus for use on small motorized carts (or "karts" as they are called in the art) such as racing karts, go-karts, fun karts and the like wherein a clutch hub fits a horizontal drive shaft and rotates therewith, the hub providing a backing plate member with struts for supporting a plurality of arcuate wear pads, a plurality of coil springs extending from the wear pad toward the clutch hub, and an annular ring being mounted to "float" about the clutch hub, and the floating ring providing openings for attaching the coil springs thereto. The apparatus provides improved control of heat transfer between the engine, the engine drive shaft, and the critical parts of the clutch including the coil springs.

2. General Background

Small powered carts ("karts") are well known in the art as "racing karts", "go-karts" or as "fun karts" These small powered carts are typically powered by a three to ten (3–10) horsepower internal combustion engine having a horizonal drive shaft. Power from the engine is normally transferred through the drive shaft to a clutch shoe assembly that rotates with the drive shaft. The drive shaft and clutch shoe assembly are affixed using a key and a keyway for example. A publication that features such small karts and "karting" in general is the magazine entitled *National Kart News*, published monthly. *National Kart News* carries advertisements for numerous parts including various clutch products. Another monthly publication that contains clutch product advertisements is *Kart Marketing International*.

The clutch shoe assembly supports a plurality of wear pads that are held with a spring or springs in a non-engaging position when the engine is at idle speed. When the user depresses the accelerator pedal of the cart, the increased rotational speed of the engine drive shaft produces centrifugal force that urges the wear pads away from the engine drive shaft, into engagement with a clutch housing. The clutch drum housing has an annular surface that is adapted to receive the wear pads when they expand.

Typical go-kart, racing kart or fun cart clutches provide an external sprocket that drives an endless chain connected to a similar sprocket on the axial or wheel of the vehicle. Thus, when the user is at idle speed, the clutch drum housing is disengaged, and engine drive shaft are and the shoe assembly rotate independently of the clutch drum housing. The clutch drum housing is maintained in a static position because of the sprocket and chain engagement between the clutch housing and the rear sprocket.

When the user of a go-cart or a fun cart presses the accelerator, centrifugal force expands the wear pads away from the rotational axis of the clutch hub. This causes the clutch wear pads and the wear surfaces of the clutch wear pads to bear against an annular surface on the clutch drum housing. Once sufficient centrifugal force has been imparted to the wear pads, they fully engage the clutch drum housing so that the housing rotates together with the clutch pads or shoes and the hub and thus with the engine drive shaft propelling the cart rapidly forward. Such prior art centrifugal clutches have been manufactured and sold for years by Max-Torque, Ltd. of Melrose Park, Ill.

Some small motorized carts are sometimes used for racing purposes. Racing carts require close tolerances, differing centrifugal loading and different heat considerations. One of the prime considerations with racing clutches of this type is that of excess heat. Heat transfer between the clutch housing and the clutch hub can be significant. One of the weak links in such a clutch are the springs which can be subject to damage when temperatures increase to about two hundred fifty degrees fahrenheit (250° F.) for example. In such a situation, the springs begin to anneal and can fail.

SUMMARY OF THE INVENTION

The present invention provides an improved centrifugal clutch apparatus for use with chain-driven karts, racing karts, fun karts, and go-karts as they are known in the industry. The present invention provides an improved clutch apparatus having protection against excess heat transfer between the clutch drum housing and the clutch hub.

One of the features of the present invention is that of improved control of heat transfer through the use of an annular member that floats about the clutch hub, being spaced therefrom to discourage significant heat transfer from the hub to the clutch spring. This is preferably accomplished by providing an annular member or ring having circumferentially spaced openings therethrough and positioned about the clutch hub. The annular ring openings form attachments for hooked end portions of coil springs that extend between the annular ring and the backing plate of the wear pads. Hangers on the backing plate of the wear pads receive a hooked portion of the opposite end of each of the coiled springs.

The present invention provides a "floating" annular member that fully supports a plurality of springs for imparting the necessary tension to each of the backing plates of the wear pads. Multiple springs are provided for each backing plate of the wear pads for supplying the load needed for racing purposes. However, the present invention allows the ring to "float" about the clutch hub so that excess heat is not transferred from the clutch hub through the ring to the springs thereby damaging them.

The present invention thus provides an improved centrifugal clutch apparatus for use with small motorized carts that are powered with an internal combustion engine having a horizonal drive shaft.

The apparatus of the present invention provides a clutch drive assembly having a central sleeve with a bore for mounting the sleeve on the drive shaft of the internal combustion engine. A key and keyway can be used to form a connection between the clutch hub at the sleeve and the drive shaft of the internal combustion engine.

The clutch hub provides a circular backing plate that extends radially and circumferentially from the sleeve. The backing plate can be integrally connected to the sleeve so that the sleeve and backing plate rotate together with the engine drive shaft during use. The backing plate has a peripheral portion that is occupied by a plurality of wear pads.

A plurality of radially extending struts is mounted on the peripheral portion of the backing plate. Clutch wear pad members are mounted at the periphery of the backing plate and extending between adjacent struts. For example, in the preferred embodiment there are three radially extending struts, each mounted along a line that intersects the rotational axis of the clutch hub and being equally spaced approximately one hundred twenty degrees (120°) apart. This allows three arcuate wear pads to be of the same size and shape, each extending through an arc of about one hundred twenty degrees (120°). The wear pads have metal backing members that have end portions that are supported upon a strut. In the preferred embodiment, the end of one wear pad backing plate abuts opposing sides of a strut.

An annular ring defines a spring holder that extends about the hub but is spaced slightly from the hub so that the spring holder "floats" relative to the hub. The spring holder ring provides a plurality of circumferentially spaced openings that provide attachment positions for a corresponding plurality of circumferentially spaced, radially extending springs. The springs each extend from an opening in the spring holder ring to a particular shoe wear pad backing plate. Each spring defines a tension member that holds a particular wear pad to the struts and in a position relative to the center of rotation of the clutch hub.

A clutch drum housing member provides a bore that fits the sleeve. The clutch drum housing member provides an annular shoulder that is positioned to engage the wear side of each of the pads. The clutch drum housing member provides a sprocket for forming a connection between the drive sprocket on the wheel or axle and clutch drum housing.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1 is a side elevational view of the clutch hub, springs, backing plate and wear pad portions of the preferred embodiment of the apparatus of the present invention;

FIG. 2 is another side elevational view of the clutch hub, springs, backing plate and wear pad portions of the preferred embodiment of the apparatus of the present invention;

FIG. 3 is a side elevational view of the clutch housing portion of the preferred embodiment of the apparatus of the present invention;

FIG. 4 is another side elevational view of the clutch housing portion of the preferred embodiment of the apparatus of the present invention;

FIG. 5 is an exploded perspective view of the preferred embodiment of the apparatus of the present invention;

FIG. 6 is a fragmentary side view of the preferred embodiment of the apparatus of the present invention illustrating the floating ring portion thereof.

DETAILED DESCRIPTION OF THE PREFERRED EMBODIMENT

FIGS. 1–6 show the preferred embodiment of the apparatus of the present invention designated by the numeral 10 in FIG. 5. Centrifugal clutch apparatus 10 includes a clutch hub member 11 having a cylindrical sleeve 12 at its center. Cylindrical sleeve 12 provides a generally cylindrically shaped opening 13 that receives a horizonal drive shaft of an internal combustion engine such as a Briggs & Stratton, Honda, Techumseh and Kawasaki engine in the range of three to ten (3–10) horsepower as an example. Such engines are commonly used to power small motorized karts such as go-karts, racing karts, fun karts or the like as they are known in the industry.

A keyway 14 can be provided with clutch hub 11 at cylindrical opening 13 for forming a connection with a keyslot on the engine drive shaft.

Clutch hub 11 includes a generally circular backing plate 15 having a periphery 16. Plate 15 provides one or more radially spaced openings 17 that aid in cooling.

A plurality of struts 18–20 are positioned about the periphery 16 of backing plate 15. Each of the struts 18–20 provides opposing, generally parallel flat surfaces that receive and support ends of the opposite wear pads as will be described more fully hereinafter. The strut 18 includes opposing strut surfaces 18A, 18B. The strut 19 includes opposing flat surfaces 19A, 19B. The strut 20 includes opposing surfaces 20A, 20B.

In the preferred embodiment, there are a plurality of three wear pads 21, 26, and 31. Each of the wear pads 21, 26, 31 include an arcuate metal backing plate member and a wear surface member. Wear pad 21 includes backing plate 23. The backing plate 23 can be manufactured of the same material as is used in the construction of the backing plate 15 of clutch hub 11. Wear pad 21 includes wear surface member 22 that is of a gradually wearing material that is known and used in the art for the wearing portion of a centrifugal clutch. The backing plate 23 is preferably arcuate in shape as shown, having a curvature that tracks the periphery 16 of backing plate 15. End 24 of backing plate 23 bears against surface 19A of strut 19. Similarly, end 25 of backing plate 23 bears against surface 18B of strut 18. The other two wear pads include wear pad 26 and wear pad 31.

The wear pad 26 includes a wear surface member 27 and a backing plate 28 that is curved to correspond to the periphery 16 of backing plate 15. Backing plate 28 of wear pad 26 includes end portions 29, 30 that engage flat surfaces of corresponding struts 19–20 as described with respect to the wear pad 21. The pad wear 31 includes a wear surface member 32 attached to backing plate 33. The backing plate 33 has ends 34, 35 that bear against flat surfaces of struts 18 and 20.

A plurality of springs 36 extend between floating ring 40 and each of the backing plates of 23, 28, 33 of the wear pads. In FIGS. 1 and 6, a plurality of springs 36 are shown, each having opposed hook end portions 37, 38. Each of the backing plates of the wear pads 21, 26, 31 provides a plurality of hangers 39 that are used to secure a hook 38 portion of spring 36 thereto as shown. In the drawings, three hangers 39 for each backing plate of the pad and a corresponding number of springs 36 are shown.

For each of the springs 36, there is provided an opening 41 in floating ring 40. In the embodiment shown, a plurality of nine (9) springs 36 are shown. A corresponding plurality of nine (9) circumferentially spaced openings 41 positioned at equal angular orientations about ring 40 as shown. The ring 40 provides a central opening 42 that is larger in diameter than the external cylindrical surface 12A of cylindrical sleeve 12 at the position normally occupied by the floating ring 40. The central opening 42 thus is large enough in diameter so that a gap 52 of air is positioned between floating ring 40 and sleeve 12A.

An annular shoulder 43 divides sleeve 12 into larger 12A and smaller diameter 12B cylindrical outer surface portions. Washer 44 fits against annular shoulder 43 and defines an interface between clutch drum housing 45 and clutch drive assembly 11 at sleeve 12. Clutch drum housing 45 as shown FIGS. 3–5 includes a sprocket assembly 48 which is secured to housing 45 with a snap ring 48A. Sprocket assembly 48 includes a cylindrically shaped internal bushing 47. Bushing 47 has an outer surface 47A which is press fitted into the sprocket assembly 48, and an internal surface which is a close fit on the smaller outside diameter of cylindrical sleeve 12. A central cylindrically shaped opening 49 of bushing 47 provides a space that accepts the smaller diameter section of cylindrical sleeve 12.

Housing 45 provides an enlarged annular shoulder 50 having an inner annular surface 51. The inner annular surface 51 defines a wear surface that receives each of the wear pads when the engine is revved sufficiently to cause the wear pads to move outwardly under the centrifugal force.

The following table lists the parts numbers and parts descriptions as used herein and in the drawings attached hereto.

| PARTS LIST | |
|---|---|
| Part Number | Description |
| 10 | centrifugal clutch apparatus |
| 11 | clutch hub |
| 12 | cylindrical sleeve |
| 12A | cylindrical outer surface |
| 12B | cylindrical outer surface |
| 13 | cylindrical opening |
| 14 | keyway |
| 15 | backing plate |
| 16 | periphery |
| 17 | opening |
| 18 | strut |
| 18A | surface |
| 18B | surface |
| 19 | strut |
| 19A | surface |
| 19B | surface |
| 20 | strut |
| 20A | surface |
| 20B | surface |
| 21 | wear pad |
| 22 | wear surface |
| 23 | backing plate |
| 24 | end |
| 25 | end |
| 26 | wear pad |
| 27 | wear surface |
| 28 | backing plate |
| 29 | end |
| 30 | end |
| 31 | wear pad |
| 32 | wear surface |
| 33 | backing plate |
| 34 | end |
| 35 | end |
| 36 | spring |
| 37 | hook |
| 38 | hook |
| 39 | hanger |
| 40 | floating ring |
| 41 | opening |
| 42 | central opening |
| 43 | annular shoulder |
| 44 | washer |
| 45 | clutch drive assembly |
| 46 | clutch drum housing |
| 47 | bushing |
| 47A | outer surface |
| 48 | sprocket |
| 48A | snap ring |
| 49 | opening |
| 50 | annular shoulder |
| 51 | inner annular surface |
| 52 | gap |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A centrifugal clutch apparatus for use with small motorized wheeled carts that are powered with an internal combustion engine having a horizontal drive shaft, comprising:

a) a clutch drive assembly having a central hub with a sleeve having a bore for mounting the sleeve on the drive shaft of the internal combustion engine;

b) the hub having a hub drive plate that extends radially and circumferentially from the sleeve and connected to the sleeve so that the sleeve and the hub drive plate rotate together with the engine drive shaft, the hub drive plate having a peripheral portion;

c) a plurality of radially extending struts mounted on the peripheral portion of the hub drive plate;

d) a plurality of wear pads, each arcuate in shape and each tracking the peripheral portion of the hub drive plate, each of the wear pads having a wear pad plate with a pair of end portions that are supported respectively by a pair of the struts;

e) a spring holder that extends about the sleeve, and that is spaced radially from the sleeve;

f) a plurality of circumferentially spaced, radially extending springs that extend from the spring holder to the pad plate, each spring defining a tension member that holds the wear pad plate of each pad to the struts;

g) a clutch housing member with a bore that fits the sleeve and an annular shoulder that is positioned to engage the wear side of the wear pads, the clutch housing member having a sprocket for forming a connection between a cart wheel and clutch housing member with an endless chain.

2. The centrifugal clutch apparatus of claim 1 wherein there are at least three wear pads.

3. The centrifugal clutch apparatus of claim 1 wherein there are at least two springs attached to each wear pad plate.

4. The centrifugal clutch apparatus of claim 1 wherein the spring holder is a ring that surrounds the sleeve.

5. The centrifugal clutch apparatus of claim 4 wherein there is a gap between the sleeve and the ring.

6. The centrifugal clutch apparatus of claim 1 further comprising insulation means positioned between the sleeve and the springs for impeding heat transfer between the sleeve and springs.

7. The centrifugal clutch apparatus of claim 1 wherein the spring holder is an annular member that extends completely around the sleeve.

8. The centrifugal clutch apparatus of claim 1 wherein there are three wear pads and three of the struts, each spaced about one hundred twenty degrees apart.

9. The centrifugal clutch apparatus of claim 1 wherein the springs comprise coil springs having hooks for attaching the springs to the wear pads and spring holder.

10. A centrifugal clutch apparatus for use with small motorized carts having a plurality of wheels and that are powered with an internal combustion engine having a horizontal drive shaft, comprising:

a) a tubular sleeve having a bore for mounting the sleeve on the drive shaft of the internal combustion engine for rotation with the drive shaft, the sleeve having an axis of rotation;

b) a plate that extends radially and circumferentially from the sleeve and connected to the sleeve so that the sleeve and the plate rotate together with the engine drive shaft, the plate being generally flat to define a plane that is generally perpendicular to the axis of rotation of the sleeve, the plate having a peripheral portion;

c) a plurality of radially extending struts mounted on the peripheral portion of the plate, each of the struts being mounted on a line that extends toward the sleeve;

d) a plurality of wear pad members, each generally arcuate in shape and each tracking the peripheral portion of the plate, each of the wear pad members having a wear surface and pair of end portions that are supported respectively by a pair of struts;

e) a annular spring holder that extends about the sleeve, spaced from the sleeve so that the sleeve and spring holder can rotate relative to one another during use;

f) a plurality of circumferentially spaced, radially extending springs that extend from the spring holder to the wear pad members, each spring defining a tension member that holds a wear pad member to a pair of the struts; and g) a clutch drive member with a bore that fits the sleeve and an annular shoulder that is positioned to engage the wear surface of the wear pad members, the clutch drive member having a sprocket for forming a connection between a cart wheel and the clutch drive member with a chain.

11. The centrifugal clutch apparatus of claim 10 wherein the spring holder has a plurality of circumferentially spaced openings and the springs attach to the spring holder at the openings.

12. The centrifugal clutch apparatus of claim 10 wherein the sleeve is cylindrically shaped, having an inner cylindrical surface that closely engages the drive shaft and an outer cylindrical surface.

13. The centrifugal clutch of claim 10 wherein the plate is generally round in shape.

14. The centrifugal clutch apparatus of claim 13 wherein the plate has a plurality of openings therethrough.

15. The centrifugal clutch apparatus of claim 10 wherein an end of each of a pair of wear pad members engages a single strut.

16. The centrifugal clutch apparatus of claim 10 wherein each of the wear pad members conforms generally to the periphery of the plate.

17. The centrifugal clutch apparatus of claim 10 further comprising an endless chain that connects the sprocket and a wheel.

18. The centrifugal clutch apparatus of claim 10 wherein there are a plurality of said springs attached to each of said wear pad members.

19. A centrifugal clutch apparatus for use with small motorized carts that are powered with an internal combustion engine having a horizontal drive shaft, comprising:

a) a clutch drive assembly having a central hub and sleeve with a bore for mounting the hub and sleeve on the drive shaft of the internal combustion engine;

b) a drive plate that extends radially and circumferentially from the hub and sleeve and is connected thereto so that the hub and sleeve and drive plate assembly rotate together with the engine drive shaft;

c) a plurality of radially extending struts mounted on the peripheral portion of the drive plate;

d) a plurality of wear pads, each arcuate in shape and each tracking the peripheral portion of the drive plate, which are driven by three perpendicular tangs equally spaced on the perimeter of the drive plate;

e) a circular spring holder that extends about the hub, which is spaced radially from the hub so that the spring holder floats relative to the hub;

f) a plurality of circumferentially spaced, radially extending springs that extend from the spring holder to the wear pads, each spring defining a tension member that positions and locates each wear pad within the perpendicular tang defined areas on the drive plate; and g) a clutch drum housing member with a bore that fits the sleeve and an annular shoulder that is positioned to engage the outer surface of the wear pads, the clutch drum housing member having a sprocket for forming a connection between the drive shaft and the clutch drum housing member with an endless chain.

20. The centrifugal clutch apparatus of claim 19 further comprising insulation for floating the spring holder relative to the hub for impeding heat transfer from the wear pads and the radial springs.

21. The centrifugal clutch apparatus of claim 19 wherein the spring holder is an annular member that extends completely around the hub and is suspended by the springs.

22. A centrifugal clutch apparatus for use with small motorized vehicles including carts that are powered with an internal combustion engine having a horizontal drive shaft, comprising:

a) a tubular hub and sleeve having a bore for mounting the hub and sleeve on the drive shaft of the internal combustion engine for rotation with the drive shaft, the hub and sleeve having an axis of rotation;

b) a drive plate that extends radially and circumferentially from the hub and sleeve and connected to the hub and sleeve so that the hub and sleeve and drive plate rotate together with the engine drive shaft, the drive plate being generally flat to define a plane that is generally perpendicular to the axis of rotation of the hub and sleeve, the drive plate having a peripheral portion;

c) a plurality of wear pad drive tangs located on the peripheral portion of the drive plate, each of the tangs being generally perpendicular to the plane of the wear pad and equally spaced on the periphery of the drive plate;

d) a plurality of wear pad members each generally arcuate in shape and each tracking the peripheral portion of the drive plate, and a clutch drum housing member;

e) an annular spring holder that extend about the sleeve, and spaced from the sleeve so that the spring holder floats and does not contact the sleeve, so that the sleeve and spring holder can rotate relative to one another during use;

f) a plurality of circumferentially spaced, radially extending springs that extend from the spring holder to the wear pad members, each spring defining a tension member that positions and locates each wear pad within perpendicular tang defined areas on the drive plate; and g) a clutch drum housing member with a bore that fits the sleeve and an annular shoulder that is positioned to engage the outer surface of the wear pad members, the clutch drum housing member having a sprocket for forming a connection between the vehicle drive shaft and the clutch drum housing member with an endless chain.

\* \* \* \* \*